July 20, 1965  K. R. HANSFORD ETAL  3,195,981
DECOMPOSITION OF IRON SULPHATE
Filed Dec. 10, 1962
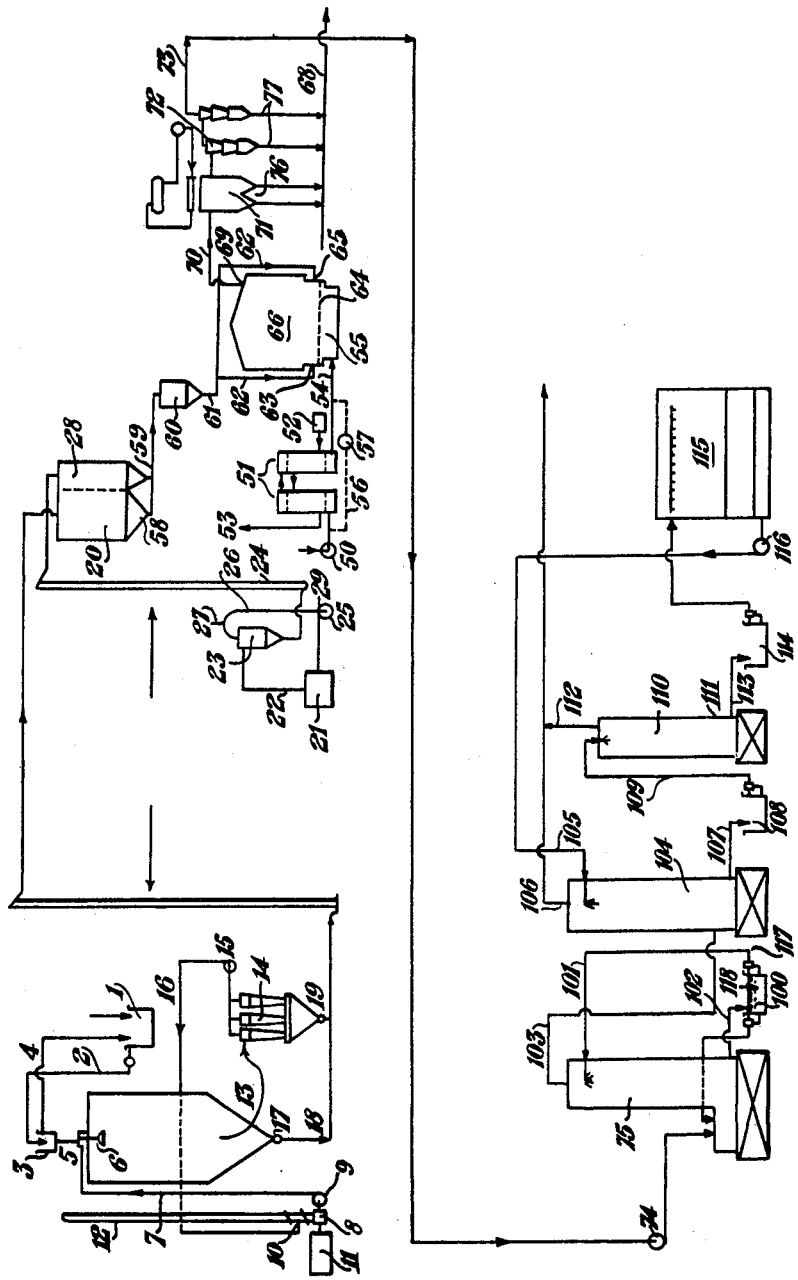
Inventors:
Kenneth Ralph Hansford,
Austin Leslie Roberts,
Arthur Wallace Evans, and
William Hughes.
By: Baldwin & Wight  Attorneys

# United States Patent Office 3,195,981
Patented July 20, 1965

3,195,981
DECOMPOSITION OF IRON SULPHATE
Kenneth Ralph Hansford, Durham, England, Austin L. Roberts, Umbogintwini, Natal, Republic of South Africa, and Arthur Wallace Evans, Middlesbrough, and William Hughes, Durham, England, assignors to British Titan Products Company Limited, Durham, England, a corporation of Great Britain
Filed Dec. 10, 1962, Ser. No. 243,221
7 Claims. (Cl. 23—177)

This application is a continuation-in-part of our copending application, Serial No. 726,889, now abandoned, for Decomposition of Iron Sulphate.

This invention is concerned with the production of sulphuric acid from hydrated iron sulphate.

It is well known that iron sulphate, especially in the form of ferrous sulphate heptahydrate, is a by-product of many industries and, although having certain uses, such as the treatment of sewage and the making of iron oxide pigments, and indeed, in the preparation of sulphuric acid, these industries have, so far, failed to consume any appreciable proportion of the by-product available. In consequence, where this material is produced in large quantities, as for instance, in the steel pickling industry, and also in the titanium pigment industry, it has been necessary to find various means of disposal as a trade waste. This has been accomplished by various means, such as dumping on land, and also in the sea, either as solid crystal or in solution. It will be appreciated that disposal in either of these ways can, with or without neutralisation or insolubilisation with chalk or lime, ultimately not only be a nuisance, but constitute a loss of a relatively concentrated source of sulphur and a potential source of high quality iron. Many schemes have been attempted to convert iron sulphate in various forms of hydration and of oxidation into sulphuric acid and iron oxide. Some of them after having been put into operation on a substantial scale, have had to be abandoned or continued only on a very localised experimental scale, due to various difficulties and problems which were encountered.

Whilst there are many forms in which iron sulphate may be produced, the more common form is that of ferrous sulphate with or without minor proportions of ferric sulphate and sometimes accompanied by a proportion of free sulphuric acid. This ferrous sulphate is usually obtained in various forms of hydration of which the normal or most common is ferrous sulphate heptahydrate $FeSO_4.7H_2O$. The process of the present invention is especially concerned with this latter material.

The production of sulphuric acid and iron oxide from copperas in the most generally accepted way necessitates the introduction of two operational steps apart from such well known processes as the conversion of sulphur dioxide to sulphuric acid. The two steps referred to are: (a) dehydration or removal of the greater part of the water content from the copperas: and (b) decomposition of the iron sulphate by heat.

Of the many methods employed for dehydrating copperas, one is by spray drying. The method of spray drying is essentially old but there have been economic difficulties in applying it, although these have been overcome by an improvement in the spray drying process as described in British Patent 800,410. The product of such improved process is essentially ferrous sulphate with a degree of hydration approximating to the formula $FeSO_4.1-3\ H_2O$, usually averaging in practice around $$FeSO_4.2H_2O$$

is a relatively fine material averaging 80μ in diameter and consisting of loosely bound aggregates of fine dusty material. The process of the present invention is particularly suited to handle such material although it can also deal with dehydrated forms of copperas of a coarser size and more firmly bound character.

It is known that the decomposition of iron sulphate is an endothermic reaction and that it requires the application of heat either externally or generated in situ. Many materials, particularly carbonaceous materials or sulphur-containing materials, which burn in air, with liberation of heat have been employed as auxiliary forms of heat to effect the decomposition of the iron sulphate. Further, it is known that methods for the decomposition of iron sulphate in contact with these materials which will burn in air with liberation of heat have been suggested in the prior art. An example of this is to be found in British Patent 721,591 wherein pyrites is burnt in a fluidized bed and the heat of reaction is utilised in the decomposition of iron sulphate with an enhanced sulphur content in the liberated gases. There have been, however, difficulties in operation when fine products such as those derived from spray drying of copperas are involved. Whilst for instance, the product of spray drying of copperas is of the nature of spheres, which may be hollow, and free flowing, such spheres being relatively uniform in size and of the order of 80μ with 97% less than 200μ, this size is not the determining factor, since these products are extremely fragile and are mainly to be considered as aggregates of particles of the order of 5μ. It will be appreciated, therefore, that in feeding such material into a fluidized reactor disintegration of the aggregates takes place very rapidly and the fine resultant dust can readily be swept out of the reactor before it has time to decompose. In the operation of fluid bed processes involving the use of this loosely aggregated lower hydrate of ferrous sulphate, it has been found necessary to work with very low fluidizing velocities and, in consequence, very large hearth areas, and hence high capital outlay is involved. Furthermore, in such operations due to high heat losses, it is difficult to control the temperature without considerable increase in the fuel consumption which again militates against the economy of operation. It is unnecessary to enlarge upon the undesirable results obtained where the material is blown out of the furnace before having undergone decomposition, particularly as in its fine powdery condition, it becomes difficult generally to handle.

It is the primary object of the present invention to overcome the problems of decomposition of spray dried copperas when operating by a fluidized bed process in which combustible materials, e.g. carbonaceous or sulphur-bearing materials are used for the generation of auxiliary heat to permit the decomposition.

The process of the invention for the continuous decomposition of iron sulphate in the presence of a powdered or liquid reducing fuel undergoing combustion in a fluidized bed, comprises the employment of a substantially inert material of a sand-like nature which serves as a restraining bed to retain fine particles of iron sulphate for a sufficient time to enable substantially complete decomposition to sulphur dioxide, iron oxide and water vapour, the sulphur being liberated in the emergent gas substantially all in the form of sulphur dioxide and the iron oxide produced by decomposition being removed by these gases thereby being substantially all purged from the bed.

The following description of how the process may be performed is related more particularly to the use of copperas, $FeSO_4.7H_2O$, as the essential raw material.

Initially there is prepared a suspension of iron sulphate monohydrate in an iron sulphate solution by the methods of British Patent 800,410, this suspension having a composition represented by $FeSO_4.6.5-16\ H_2O$ preferably between $FeSO_4.7$–$10 H_2O$. The suspension, maintained at a temperature between 65 and 90° C., is admitted into the top of a spray drying tower where it is contacted with a drying gas at a temperature of 150 to 900° C., preferably of 350 to 600° C., at the inlet so that the product of the drying operation will be collected at the bottom of the chamber having a composition varying between $FeSO_4.1$–$3 H_2O$ and preferably $FeSO_4.1.2$ to $2.5 H_2O$. The discharged gas contains some solid in suspension which is removed by passage through a series of cyclones, the gas subsequently being optionally partly recirculated, the remainder being purged to atmosphere. The solids, discharged from the dryer are essentially spheres which are very free flowing and easy to handle. They are exceptionally uniform in size, being on average $80\mu$ in diameter and 97% at least being below $200\mu$. This dry product is essentially a fragile aggregated product, the ultimate particles being of the order of $5\mu$ diameter and, as the adhesion of these particles is not strong, these spheres will very readily break down in handling especially where attrition may take place. The dried product is conveyed to a storage hopper in preparation for the roasting operation.

Coal, normally received in a crushed condition, is ground in a disintegrator such as a pulveriser, or a disc or attrition mill. The grinding is preferably conducted in a ball mill in an atmosphere of gas having a relatively low oxygen content about 6–12% so that all danger of explosion in the grinding system is eliminated and grinding is facilitated. The gas serves to dry the coal which, as fed normally, carries a moisture content of 8–13%. A suitable gas can be derived from the acid plant tail gases which are deficient in oxygen. Alternatively, the tail gases from a subsequent air-pre-heater may be employed. The coal is thus reduced in moisture content so that it will not rehydrate the dried iron sulphate which otherwise on admixture would cake and lead to blockages. Moreover there could be an undesirable heat rise. It should therefore contain less than 5% preferably less than 2% $H_2O$. In addition the coal should have a particle size to pass 10 mesh, preferably 30 mesh B.S.S. It is stored in a bunker adjoining a bunker in which the spray dried copperas product is stored.

The ground coal and the spray dried copperas product are thereafter mixed and conveyed to a feed hopper preparatory to being admitted to the roaster. Alternatively, the ground coal, or other fuel employed, may be kept separate and supplied through individual feed lines to the roaster. The individual feed lines may join together into a common feed port or may lead respectively to separate ports. With such an arrangement the relative proportions of fuel and dehydrated copperas may be readily controlled or adjusted by varying the individual feeds. A further advantage of providing separate feeds is that a fuel such as coal need be dried only sufficiently to enable the feeding to be satisfactorily conducted. Under certain conditions it may even be desirable to admit the coal as a slurry in water or in fuel oil. Sulphur as powder, molten or in the form of a slurry, may also be admitted in this way.

The roaster may be a vertical shaft furnace lined with insulating brick having a perforated base plate through which gases may be conveyed from a wind box below. The base plate may be constructed according to various designs, but it is preferable to use a design in which each perforation has at its base a plug carrying an orifice produced with machined accuracy which will essentially control the gas flow evenly through the plate by establishing a pressure difference through the plate which is one tenth to twenty times, normally one fifth to once, and preferably at least half, the pressure drop across the bed. Other features such as the use of gas-permeable solids-impermeable devices to prevent solids entering the perforations or the wind box may be, but are not necessarily, incorporated.

Air to be admitted to the roaster may be preheated indirectly by a heater to a temperature up to 800° C., preferably between 250 and 600° C. Arrangements may be made for by-passing air directly from the fan to the roaster without passing through the heater so that air of controlled temperature can be admitted to the wind box of the roaster. The temperature to which air is heated is dependent upon the nature of the material of construction of the plant and also upon the fuel employed for the heating. Normally the fuel is optional but the most convenient for this is oil, though where coal is cheaper, the latter may be the choice. Alternatively, the hot gases from the roaster can, under certain circumstances, be used as a source of pre-heat, though, in this latter case, the capacity of the waste heat boiler may be appreciably reduced.

The bed of the roasting furnace consisting of a graded material may consist of magnetite, pyrites cinder, silica, rutile, zircon or any other crushed rock materials having the size characteristics of sand. It should be substantially inert to the reactants in the roaster and should not fuse under the temperature conditions existing therein. The depth of the bed is dependent upon the grading of the inert material and the gas velocities to be employed in the roasting operation. Normally the bed will be of the order of 3 to 5 ft. but preferably not exceeding 7½ ft. deep.

In the operation of the furnace, the bed may be initially heated by means of an ignited gas poker inserted into the graded inert material which is fluidized by air passing upwardly from the wind box through the perforated base plate. In this way, the bed is heated to a temperature of 700° C. Thereafter, the temperature may be adjusted by the admission of solid fuel, e.g. coal, or by liquid fuel, e.g. fuel oil admitted below the level of the bed or by fuel gases similarly admitted through the sides of the furnace below the level of the bed. Alternatively, the fuel gases may be admitted by separate feedings or by admixing with the air fed into the wind box below the perforated plate.

Into the pre-heated fluidized bed of inert material, the mixture of spray dried dehydrated copperas and ground coal is fed into the side of the roaster essentially at points below the surface of the bed, the number of points of entry increasing with the diameter of the furnace to ensure good distribution. Thus, for a furnace with a hearth diameter of 15–20 ft., six feed ports are suitably used although this number is by no means a limitation, and where the feed arrangements prove more than necessary, this may be reduced by isolating alternate ports. The feed arrangements will be generally similar to the foregoing if the spray dried dehydrated copperas and ground coal are fed through separate supply lines leading either to common feed ports or to individual ports. In the latter case the number of feed ports would be appropriately increased.

Whilst the pressure within the roaster may be varied within wide limits at the discretion of the operator, in the more general operation, it is desirable that the gaseous products of reaction should emerge at or around atmospheric pressure. Accordingly, the gas in the various stages passing from the wind box through the perforated plate and the bed will be operating at pressures above atmospheric and, in consequence, there will be a tendency for gas to be expressed outward rather than sucked into the furnace. Therefore, at the feed ports of the solid mixture of dehydrated copperas and coal there may be provided gas injectors to blow the solids into the furnace at each solids feed port. The amount of air consumed in this way is of negligible order, being not more than 20% but preferably less than 5% of the total air consumed in the reactor.

The hot inert sand-like material which is in a state of fluidization serves as a restraining bed which will accept the powdered coal and spray dried partially dehydrated copperas mixture and retain these materials in the bed sufficiently long, even when fluidizing with a relatively high gas velocity (possibly because it serves as a heat reservoir), that substantially complete decomposition of the iron sulphate component of the spray dried partially dehydrated copperas is effected and only the products of reaction escape from the bed. The ultimate decomposition of the iron sulphate to components emerging from the treatment zone may generally be indicated by the following equation, given by way of illustration using carbon as the reducing fuel:

$$4FeSO_4.H_2O+C=2Fe_2O_3+4SO_2+CO_2+4H_2O$$

This formula indicates the overall reaction desired by the present invention in the fluidized bed roaster. Actually, however, the initial stage of the reaction produces sulphur trioxide in addition to sulphur dioxide, and the sulphur trioxide is found to be most undesirable. The sulphur trioxide, particularly in the presence of dust particles and moisture, tends to form a stable mist, fog or fume which, not only is difficult to dissolve in water and prevent escaping to atmosphere, but is unsuitable for the production of strong acid. Such a mist, fog or fume of sulphur trioxide may also be responsible for the carrying of catalyst poisons, such as arsenic.

The present invention overcomes this difficulty by controlling the amounts of oxygen and reducing fuel so that there is sufficient excess reducing fuel to reduce the sulphur trioxide to sulphur dioxide, and in any event ensure that the sulphur content of the emergent gas in the form of sulphur trioxide is less than about 0.5%. Reaction between oxygen and the fuel is necessary in order to provide the heat for the reaction, but the amount of oxygen over and above this is limited to provide the said excess of reducing fuel. It is necessary in the present invention to provide this initial limitation on the amount of oxygen in the roaster, in spite of the fact that it is required in a later stage to provide additional oxygen for the conversion of sulphur dioxide to sulphur trioxide for the production of sulphuric acid.

The limitation of the oxygen in order to provide the aforementioned excess of reducing fuel in the bed will result in a low oxygen content in the emergent gas. This is highly advantageous since it has been found that the emergent gas contains components having a catalytic effect on the oxidation of sulphur dioxide to sulphur trioxide, and sulphur trioxide should be avoided for reasons mentioned above. Accordingly, the amount of free oxygen in the emergent gas should be kept as low as possible, preferably below 3%, in order to avoid the possibility of sulphur trioxide formation in the exit ducts from the roaster.

When the spray dried partially dehydrated copperas is delivered more or less directly from the spray drying equipment into the bed it will normally be in the form of relatively large, essentially spherical aggregates, about 80$\mu$ diameter, of weakly adhered relatively fine particles of the order of 5$\mu$ diameter. The fluidized activity of the bed quickly breaks the aggregates down by attrition into the fine particles. If the aggregates are broken down beforehand, however, the material will be already in the fine particle form when introduced into the bed. In either case, that is whether the spray dried partially dehydrated copperas is initially fed into the bed in relatively large fragile aggregate form, or in the form of ultimate fine particles, the material being treated will become or will be of such small particle size that it could not, by itself, be economically fluidized and maintained in the treatment zone long enough to be substantially completely decomposed. It would, instead, be swept out of the treatment zone by the gas stream without being substantially decomposed. Otherwise stated, the spray dried partially dehydrated copperas in its fine particle form, of the order of 5$\mu$ diameter, is not along satisfactorily fluidizable. Consequently, controlling of the conditions of the fluidized bed of relatively coarse inert material particles is essential for retaining the fine partially dehydrated copperas particles transiently resident in the treatment zone for a period sufficient to obtain effective decomposition.

Normally the bed comprising relatively coarse inert particles and very fine partially dehydrated copperas particles of the order of 5$\mu$ diameter will be fluidized by air which can vary in quantity to maintain a range of 3–25, preferably 5–10, times the minimum fluidizing velocity, and this range of air supply enables a control of the quantity of oxygen necessary for combustion. It has thus been found practical to regulate the rate of admission of air so that it lies within the preferred range of fluidizing velocity and is sufficient to permit the necessary combustion, while at the same time the oxygen can be limited beyond this point to provide the aforementioned excess of reducing fuel and preferably also to restrict the oxygen content of the emergent gas to about 3% or less. The oxygen content of the emergent gas is thus relatively low and, as previously stated, requires considerable augmentation before proceeding to the subsequent convertors in the manufacture of sulphuric acid therefrom. Moreover, the iron content of the iron sulphate is converted substantially entirely to iron oxide mainly in the form of ferric oxide, but sometimes lower forms of iron oxide may be formed, the proportions of these oxides being in large measure directly related to the temperature existing within the roaster; the higher the temperature, the greater the tendency to form the more reduced oxide. The oxide is conducted from the bed by entrainment in the gases so that the iron oxide derived from the iron sulphate feed is substantially entirely removed from the bed almost as soon as it is produced. It will be noted, therefore, that there is little accumulation or build-up of the iron oxide content either on or within the bed of inert material.

This iron oxide or cinder is remarkably low in carbon content, substantially all of the coal being burnt. The carbon content does not exceed 5% and is frequently below 1%. The cinder is also substantially free from sulphur values. Thus, operating the furnace at temperatures of 900° C. sulphur values have been achieved as low as 0.1% S in the cinder. In normal operation, however, the figure aimed at is between 0.5 and 1% S and is, in any case, maintained below 5.0% S.

The temperature maintained during the roasting operation may vary between 700° C. and 1100° C., the preferred range being 700–950° C. Whilst working at the lower end of this range, i.e. 700° C., is considered bad practice in certain types of prior art pyrites roasting processes where excess oxygen is present and $SO_3$ is likely to be formed, this does not apply in the present process, as it is possible to work with oxygen content in the gases leaving the bed of 3% or less so that formation of $SO_3$ is inappreciable. Whilst operation at higher temperatures results in the presence of a lower $SO_3$ content this involves the requirement to use extra fuel, but there is an advantage in the increased rate of decomposition of the iron sulphate and in that the extra heat produced by the fuel achieves higher temperatures in the gases, such extra heat being recoverable by the subsequent waste heat boiler which can operate with an efficiency comparable to a conventional boiler plant.

The temperature of the reaction may be controlled in the more general sense by the relative proportions of ferrous sulphate and coal. This, however, may be further controlled by injecting fuel oil into the bed, but the finer control is provided by adjustment of the temperature of preheated air admitted to the roaster. By adjustment of the control valve on the by-pass, more or less cold air may be admitted to the hot air issuing from the air heater which will enable the temperature of the preheated air to be varied, and this, in turn, will affect the temperature existing in the roasting furnace.

In the case that the ground coal or other reducing fuel, on the one hand, and the spray dried copperas, on the other hand, are fed by individual supply lines, temperature control may be obtained by varying the feed rates of the fuel and of the dehydrated copperas. Fine temperature control can also be obtained, if desired, by varying the temperature of preheat of inlet air, or by injecting fuel oil, or by other means.

The gases emerging from the furnace are immediately passed through a waste heat boiler where they are cooled to below 350° C., and subsequently are passed through a cyclone system in order to remove the greater part, i.e. at least 80% and usually above 90%, of any iron oxide which is entrained therein, such waste heat boiler and cyclone discharging dust collected therein into the cinder conduit from which the cinder generally is discharged for disposal to the steel industry. This cinder, although easily handled, is of a comparatively fine and somewhat dusty nature and, for transport, it is often desirable to damp it somewhat beforehand. As will be seen later, there is a proportion of wet slurry or paste derived from the final cleaning of the gases which serves for this damping operation and obviates an otherwise undesirable extra operation of drying the slurry beforehand. The gases, after passing through the cyclones, are conveyed to an evaporative cooler where they are cooled in a tower sprayed by water recirculated within a closed system. In this way, the gases are cooled from a temperature of less than 350° C. to around 70° C. During this operation substantially all the remaining iron oxide entrained in the gases is removed and is continuously or periodically purged to be thickened and used as a sludge to render the cinder collected in the earlier cyclones more amenable for transport. The gases leaving the evaporative cooler are then passed upward through a cooling tower where there is a counterflow of cold water. In this operation, the gases are cooled to a temperature of around 35° C.

Because of the high heat content of the gases, substantial quantities of water will be needed for this cooling process, but the water may be re-used in a circulating system including a cooling tower because no appreciable amount of dust or $SO_3$ is present at this point. A suitable stripping tower is, however, necessary before the water can be returned to the cooling system. This stripping tower is essentially a tower where the liquid flows downward through a chamber countercurrent to an air stream passing upward through it, which latter picks up $SO_2$ dissolved in the water, the air stream escaping therefrom being admitted to the main gas stream proceeding to the acid plant.

The gases finally leaving the lower temperature cooling tower at 35° C. or thereabouts, and before admission of the above stripping gas, have an $SO_2$ content up to 15% with an oxygen content of the order of 0 to 3% and not more than 6%. These gases are, as indicated, admixed with the stripping gas used for purging $SO_2$ from the cooling water. Further air is also admitted, if required, to produce an oxygen content at least half and preferably once to twice the sulphur dioxide content. The gas is then available for immediate conversion to sulphuric acid by first passing through a sulphuric acid drying tower and subsequently through a converter according to conventional procedure.

The process of the invention, in a suitable embodiment, may be more clearly followed by reference to the accompanying flow diagram in which is shown a heated tank 1 to which copperas is fed and in which the copperas is converted into a solution of ferrous sulphate with ferrous sulphate monohydrate in suspension. This suspension is circulated via main 2 to an overhead tank 3 and an overflow main 4 back into tank 1. In this way, the solution in tank 3 is maintained at a substantially constant temperature to avoid solidification of the suspension. The overhead tank serves for feeding the spray dryer equipment via a conduit 5 into a spray equipment 6. The dryer is fed by hot air led through a conduit 7 and derived from a mixing chamber 8 via fan 9, the air having been preheated indirectly by an oil fired heater 11 venting through a chimney 12. The gases emerging from the spray dryer through a vent 13 pass through a cyclone system 14, by means of which the dust is removed, and are withdrawn by means of a fan 15 through a main 16, about 25% re-entering the air mixing chamber 8 at a point 10, the remainder being vented to atmosphere via a pipe 12. The spray dried iron sulphate is mainly in the form of fragile aggregates, of the order of 80μ diameter, of particles of the order of 5μ diameter, of ferrous sulphate dihydrate $FeSO_4.2H_2O$, (the term "dihydrate" being used generally to express the solid powder resulting from spray drying). The spray dried copperas in this form is discharged via a port 17 into a conveyor 18 which picks up the discharge from the cyclone system at the bottom 19 and carries the material forward to a storage hopper 20.

Crushed coal is fed to a mill 21 from which the ground material is conveyed via a conduit 22 to a cyclone 23. Meantime air low in oxygen content is fed through a fan 25 into mill 21 and is returned via the cyclone 23 and a conduit 26 to the fan 25. This air is replenished via a conduit 29 and is purged via an outlet 27. The ground coal is discharged from the cyclone to a conveyor 24 which transports it to a coal bin 28. If the coal as fed to the mill 21 has a moisture content so high as would cause difficulties in the reaction process to follow, as for example rehydration of the spray dried iron sulphate, blockages and undesirable temperature rise, the moisture content of the coal should be reduced to less than 5% and preferably less than 2% before the coal is delivered to the reactor. This may be accomplished, for example, by maintaining a drying atmospheric or gaseous condition in the mill 21.

Air is pumped through a fan 50 to a heat interchanger 51 heated indirectly by an oil fired furnace 52, the vent gases from the latter being discharged via a pipe 53 to be used optionally for drying in the coal grinding unit at 29. The air preheated in the interchanger is discharged via a conduit 54 to the wind box 55 of a roaster 66, a by-pass 56 of unheated air from the fan 50 to the conduit 54 with a valve 57 serving to control the temperature of the gases entering the wind box. The dihydrate in the bunker 20 is discharged through its bottom 58 into a conveyor 59 and at the same time, powdered coal from the bunker 28 is discharged into the same conveyor line. By controlling the rates of discharge of these materials into the conveyor line, a mixture is obtained in a storage hopper 60 prior to feeding into the roaster. From the hopper 60 via a discharge outlet 61 the mixture of dihydrate and powdered coal is led through a number of conduits 62 and is injected into the roaster 66 by compressed air at points 63 immediately above a perforated base plate 64 of the roaster. Additionally, a further port is provided for feeding in above the perforated plate fuel oil where necessary at the point 65. The roaster 66 is a heat insulated (not shown) chamber containing a bed of inert material supported by the perforated plate 64 through which fluidizing gases are admitted. The iron oxide, generally from this point onwards referred to as cinder, produced within the inert bed, escapes from the top of the bed and is entrained in the gases emerging from the top of the roaster at port 69. From thence the gases are conveyed via a conduit 70 to a waste heat boiler 71 and onward to cyclones 72. From the latter they are conveyed via a conduit 73 through a fan 74 to an evaporative cooler 75. Meanwhile, iron oxide solids which are collected in the waste heat boiler 71 and the cyclones 72 are discharged through outlets 76 and 77 respectively into a conduit 68 which conveys the cinder for disposal.

The evaporative cooler consists of a tower 75 through which water from a tank 100 is circulated via a main 101 to bathe the gases and so cool them by a countercurrent stream which is returned via a conduit 102 to the tank 100 in a closed system. Periodically or continuously part of the stream circulating through the main 101 is purged at 117 and the iron oxide content contained therein is recovered. The system is replenished by water when required at 118. The gases discharged from the evaporative cooler 75 pass via conduit 103 to a cooling tower 104 where they are washed by passing the gases upward through the tower countercurrent to a stream of water from a conduit 105. The gases are discharged from the top of the tower through a conduit 106 to be conveyed to the sulphuric acid plant (not shown) where they are suitably adjusted for oxygen content, including conversion of sulphur dioxide to sulphur trioxide, and are dessicated in contact with concentrated sulphuric acid, and subsequently the sulphur content converted to sulphuric acid. The water passing down the tower 104 is collected via an outlet pipe 107 into a tank 108 and from thence it passes via a conduit 109 to a stripping tower 110 where it flows countercurrent to an upward flowing stream of air entering near the bottom at 111 and discharging at the top at 112, which is connected to conduit 106 to join the main gas stream and thereby assist to adjust the oxygen-sulphur dioxide content en route to the acid plant. The water so stripped of these sulphur gases passes through a discharge pipe 113 to tank 114 and to a water cooling tower 115 from which it is pumped via a pump 116 through the main 105 for re-use in the low temperature cooling tower 104.

The following example is given for the purpose of illustrating the invention.

*Example*

A slurry consisting of a suspension of ferrous sulphate monohydrate in a saturated solution of ferrous sulphate in water at a temperature of 80° C. was prepared by the method previously described in British Patent 800,410. The concentration of this slurry was equivalent to that represented by the relationship $FeSO_4.8H_2O$ and it was held in a storage vessel and maintained at the temperature of 80° C. with agitation prior to being fed to the spray dryer. The dryer was fed with hot gases which were derived from the combustion of fuel oil and which entered at a temperature of 350° C. and the dry free-flowing solid product collected had a composition represented by $$FeSO_4.2H_2O$$

Coal of a gross calorific value on a dry ash free basis of 13,000 B.t.u./lb. was ground to a particle size all below 60 mesh B.S.S. and during grinding was dried to 0.5% moisture content. The "dihydrate" product was mixed with the ground coal in the proportion of 100 parts dihydrate to 14 parts coal to provide the roaster feed.

The roaster consisted of brick lined shaft furnace 9 ft. in height and of internal diameter 1 ft. 6 ins. fitted with a perforated base plate having a gas chamber below. The top of the roaster was provided with a port for the discharge of the product gases and suspended iron oxide and with a port 4 ins. above the base plate for feeding the mixture of dihydrate and coal. The symmetrically arranged perforations in the perforated plate totalling twenty-one were each fitted with a detachable orifice on the under-side of the plate and fitted with a gas permeable disc on the upper side. The roaster was filled with magnetite of 30–50 mesh B.S.S. such that the depth of the bed on fluidization was 5 ft.

To start up, a pre-ignited gas poker was inserted through the feed port into the bed which was fluidized with air preheated to a temperature of 400° C. When the temperature of the bed had reached 800° C. the gas poker was withdrawn and feeding of dihydrate-coal mixture at a rate of 120 lbs. per hour begun, the flow of the preheated air being maintained and controlled, at a rate of approximately 125 lbs. per hour, such that the percentage of oxygen in the exit gases was less than 1%.

The gases leaving the roaster at a temperature of 800° C. contained 9.2% $SO_2$, 0.5% $SO_3$ and 26% $H_2O$ by volume and were led through a cyclone which removed 90% of the iron oxide dust burden and were then led to a wash tower where cooling was effected to an exit gas temperature of 75° C. and the remainder of the suspended iron oxide was washed from the gases. They were then passed to a second cooling tower and cooled to a temperature of 35° C. By this means a substantial part of the water burden was removed and the gases leaving the second cooler contained 11.7% $SO_2$, 5.5% $H_2O$, <1% $O_2$ by volume. These gases were led to a drying tower irrigated with concentrated sulphuric acid where dilution air was admitted to give a gas containing 6.5% $SO_2$ and 9.9% $O_2$ suitable for use in a conventional vanadium catalyst conversion plant.

In the foregoing, for simplicity the process has been described in relation mainly to the recovery of iron oxide and sulphuric acid from waste copperas. This is because copperas is, by far, the most common form of iron sulphate and is a by-product in the manufacture of titanium oxide from titaniferous iron ores, i.e. ilmenite and from the steel pickling industry. It is a by-product from other industries but the quantities available are less important. Copperas is normally available as a relatively fine green crystal having the chemical composition $FeSO_4 7H_2O$. Iron sulphate, however, may occur in other hydrated forms and, under other names, which are sometimes referred to generally as copperas or, in certain cases, are referred to otherwise as, for instance siderotite. All these forms, however, normally would require to be dehydrated and the spray drying procedure adopted herein is applicable. In the case where monohydrate is available this may be used directly in the roasting operation. Furthermore, copperas and the other hydrate referred to may contain various minor impurities which could consist of, for instance, manganese, magnesium and many other impurity metals mainly in the form of sulphates. It may also contain some free sulphuric acid which could, according to requirement, be neutralised by addition of, for instance, an alkali and, in addition, it frequently has an excess of moisture, i.e. it is in a damp condition. Furthermore the iron content of the copperas may, under certain circumstances, have undergone a considerable degree of oxidation and therefore the product may well contain varying proportions of iron in the ferric state. This, however, will not present any difficulty to one skilled in the art and the method of roasting will, in any case, be followed as described herein.

It will have been noted that the inert material which constitutes the bed may be selected from a wide range of mineral substances which have sand-like characteristics. As regards this definition reference may be made to the Chemical Engineers Handbook, Perry, 3rd Edition, 1950, page 939, wherein it is stated "in general metallurgical practice sands are considered to be particles coarser than 200 mesh, 0.074 millimetres," i.e. 74μ. Whilst an upper limit is not afforded by this definition, it may be taken that sands may be characterised as generally passing through an eight inch mesh. (1.8 mm.) It will be obvious to one skilled in the art that sands are frequently materials preferably of the order of size of 100–500μ and are hard massive crystalline bodies which will withstand considerable abrasion, even at elevated temperatures, i.e. up to, for instance, 1200° C.

This specification refers to the fact that in operation the ultimate sulphur trioxide content of the gases generated is low in respect of sulphur dioxide content, that is to say not more than 0.5% of the sulphur content in the gases exists in the form of $SO_3$ and, in most cases, is far below this figure. In consequence, in the operation of the process, there is no problem with regard to sulphuric acid mists or, in the washing of the gases, of high acidities occurring in the wash water. Furthermore, this also means that the sulphur efficiencies throughout the process are correspondingly improved.

In the low temperature cooling tower where the gases are cooled to 35° C., water is condensed from the gases to such an extent that the amount remaining and which is removed by the concentrated sulphuric acid in the drying tower does not dilute this acid more than is required to maintain the final acid concentration when the sulphuric acid from the drying tower is, in turn, used to absorb the sulphur trioxide from the converter. In consequence, the temperature limit for cooling will be a variable, dependent on the conditions existing in the succeeding acid production plant.

In the evaporative cooler are entrapped those iron oxides carried over from the earlier cyclone equipment. This means a gradual accumulation of iron oxide in the recirculating hot water system. A bleed of iron oxide slurry may be removed for settling in a thickener from which it may be continuously or periodically removed, washed if necessary and, if required, filtered. This slurry represents up to 20% of the total iron oxide production but it may be utilised to mix with the dry cinder before transportation of the latter, serving to avoid undue wind losses.

The choice of reducing fuel or fuels for utilisation in this process is very wide and it is not proposed to enumerate all the known fuels which could be made available. It suffices to say that whilst coal is the preferred fuel in the roasting, various carbonaceous materials such as coke, charcoal, anthracite, bitumen and pitch may equally well be employed. Also liquid fuels such as fuel oil, creosote-pitch, and tar may be used. Also gaseous fuels such as various hydrocarbons, producer gas, and many other types of carbonaceous fuels are envisaged. Furthermore, certain sulphur products as, for instance, pyrites, pyrrotite or even native sulphur may be employed. It will be appreciated that these fuels may be mixed in almost all proportions with one another to produce the desired results. As indicated in the foregoing, whilst sufficient heat must be generated in the burning of the fuel to maintain the temperature of decomposition of the iron sulphate, an excess of fuel may be utilised and, providing this does not seriously complicate the decomposition of the iron sulphate, i.e. not used to great excess, when the sulphur content of the gases would be very low, there is no limitation in this direction.

We claim:

1. A process for the production of sulphur dioxide by the decomposition of an iron sulphate product of partial dehydration of a higher iron sulphate hydrate, said process consisting essentially of progressively introducing spray-dried partially dehydrated material comprising ferrous sulphate having a composition from $FeSO_4 \cdot 1-3H_2O$ to $FeSO_4 \cdot 1.2-2.5H_2O$ consisting essentially of fine particles, not themselves fluidizable under the conditions prevailing, into a hot bed of up to about 7½ feet depth of fluidizable relatively coarse particles of inert material at a temperature of not above about 1100° C.; introducing a finely divided reducing carbonaceous fuel containing not more than about 5% moisture into the bed; continuously admitting into the bottom portion of the bed an oxygen-containing gas stream in an amount sufficient to fluidize said bed and to burn a portion of said reducing fuel and maintain the temperature of the bed high enough but not above about 1100° C. to promote decomposition of said relatively fine partially dehydrated ferrous sulphate particles to sulphur dioxide and sulphur trioxide; controlling the amount of reducing fuel and oxygen so that there is an excess of the reducing fuel in the bed over that required to burn with the oxygen for maintaining said temperature; utilising said excess to effect reduction of the sulphur trioxide produced to sulphur dioxide whereby the sulphur content of emergent gas in the form of sulphur trioxide is limited to less than about 0.5%; and maintaining a pressure drop of the oxygen-containing gas as it enters the bed at between 1/10 and 20 times the pressure drop across the bed itself.

2. A process according to claim 1 in which the oxygen content of the emergent gas is maintained at a maximum of about 3%.

3. A process according to claim 1 in which said relatively fine particles are of a stable particle size of about $5\mu$ diameter, and said inert material particles are of a size of the order of about $100\mu$ to $500\mu$ diameter.

4. A process according to claim 1 in which said reducing fuel is introduced into said bed in admixture with the ferrous sulphate material and said reducing fuel is dried powdered coal.

5. A process according to claim 1 including cooling the gases emerged from said bed with entrained solids to a temperature below 350° C.; subjecting the gases to a separation process to remove the major part of entrained solids; and then spraying the gases with water to remove residual solids.

6. A process according to claim 1 in which the depth of said bed is from about three feet to about five feet.

7. A process for the production of sulphur dioxide as set forth in claim 1 in which said spray-dried partially dehydrated material, when introduced into said bed, is in the form of fragile aggregates of the order of $80\mu$ diameter made up of fine particles of the order of $5\mu$ diameter, said oxygen-containing gas stream breaking said fragile aggregates down by attrition in said bed into said fine particles.

References Cited by the Examiner

UNITED STATES PATENTS

| 2,171,574 | 9/39 | Lambert et al. | 55—57 |
| 2,242,763 | 5/41 | Smith | 23—177 |
| 2,631,178 | 3/53 | Morton | 75—5 X |
| 2,774,661 | 12/56 | White | 23—179 X |
| 2,761,764 | 9/56 | Johannsen | 75—9 |
| 2,966,232 | 12/60 | Austin | 66—97 |

FOREIGN PATENTS 727,799  4/55  Great Britain.

BENJAMIN HENKIN, *Primary Examiner.*

MAURICE A. BRINDISI, *Examiner.*